United States Patent [19]

Miller

[11] E Re. 30,035

[45] Reissued *Jun. 19, 1979

[54] ARTICULATED LINK CONVEYOR

[76] Inventor: Eldon S. Miller, 5132 San Jose, Tampa, Fla. 33609

[*] Notice: The portion of the term of this patent subsequent to May 26, 1987, has been disclaimed.

[21] Appl. No.: 791,539

[22] Filed: Apr. 27, 1977

Related U.S. Patent Documents

Reissue of:

[64] Patent No.: 3,653,494
Issued: Apr. 4, 1972
Appl. No.: 37,155
Filed: May 14, 1970

U.S. Applications:

[63] Continuation of Ser. No. 623,485, Oct. 17, 1975, abandoned, which is a continuation of Ser. No. 455,802, Mar. 28, 1974, abandoned, which is a continuation-in-part of Ser. No. 769,248, Oct. 21, 1968, Pat. No. 3,513,965, which is a continuation-in-part of Ser. No. 655,401, Jul. 24, 1967, abandoned.

[51] Int. Cl.[2] ..... B65G 15/30
[52] U.S. Cl. ..... 198/850
[58] Field of Search ..... 198/850, 853, 852, 851

[56] References Cited

U.S. PATENT DOCUMENTS

| | | | |
|---|---|---|---|
| 2,319,617 | 5/1943 | Manierre | 198/852 |
| 3,333,678 | 8/1967 | Rodman | 198/852 |
| 3,513,965 | 5/1970 | Miller | 198/195 |

*Primary Examiner*—Jeffrey V. Nase
*Attorney, Agent, or Firm*—Leo A. Rosetta

[57] ABSTRACT

A conveyor of like, individual, flat-top articulated links is described wherein the articulating mechanism permits angular movements in a common plane and wherein the individual links are downwardly stepped at a top front surface portion and upwardly stepped at a bottom rear surface portion to provide for nesting interfitting of top and bottom surface portions of successive links permitting fanning out in a common plane without mutual separation while at the same time presenting link [supper] *upper* surface support portions lying in a common plane.

2 Claims, 5 Drawing Figures

ARTICULATED LINK CONVEYOR

Matter enclosed in heavy brackets [ ] appears in the original patent but forms no part of this reissue specification; matter printed in italics indicates the additions made by reissue.

*This is a continuation of application Ser. No. 623,485, filed Oct. 17, 1975, now abandoned, which was a continuation of Ser. No. 455,802, filed Mar. 28, 1974, now abandoned, for Reissue of Pat. No. 3,653,494, and which was a continuation-in-part of application Ser. No. 769,248, filed Oct. 21, 1968, and now Pat. No. 3,513,965, said Ser. No. 769,248 being a continuation-in-part of application Ser. No. 655,401, filed July 24, 1967, now abandoned.*

The present invention is directed to overlap mechanism in such links permitting their fanning out in angular movements of a conveyor without separation between the individual links.

A more particular object of the invention is to provide an articulated conveyor of like links wherein the individual links are downwardly stepped at a top front surface portion and upwardly stepped at a bottom rear surface portion to provide for interfitting of top and bottom surface portions of successive links permitting fanning out in a common plane without separation.

Still another object of the invention is to provide a conveyor of articulated links wherein the top or supporting surface will be defined by upper surface portions of successive articulated links thereof.

Another object of the invention is to provide a conveyor of articulated links of the character described wherein the zones of demarcation between the stepped upper surfaces of the individual links are defined by inclined riser surfaces presenting obtuse angular inner and outer corner edges therealong to facilitate cleaning and sanitizing of a conveyor.

Other objects, features and advantages of the invention will be apparent from the following description when read with reference to the accompanying drawings. In the drawings, wherein like reference numerals denote corresponding parts throughout the several views.

Figure 1:
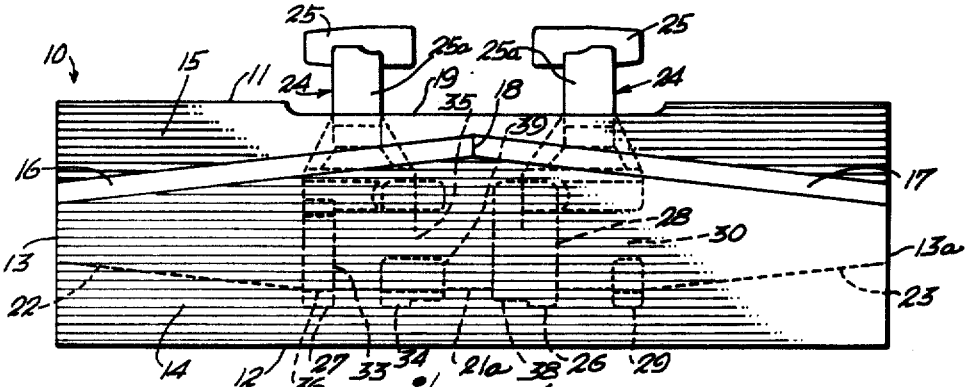
FIG. 1 is a top plan view of a conveyor link embodying the invention.
Figure 2:
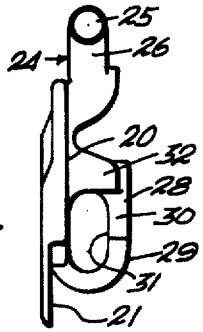
FIG. 2 is an end view thereof.

Referring now in detail to the drawings, reference numeral 10 designates, generally, a conveyor link embodying the invention, the same preferably either being integrally molded of a tough, synthetic plastic material, or integrally cast of a strong, light-weight metal such as aluminum. As illustrated in FIGS. 1 and 2 the conveyor link is of elongated rectangular shape defined by spaced, parallel front and back edges 11 and 12, respectively, and spaced, parallel side edges 13, 13a. Link 10 is formed with a flat top or support surface 14 which, near the front marginal edge 11, merges with a relatively parallel, downwardly stepped or relief portion 15 at bevelled zones of demarcation 16 and 17 extending angularly in the direction of the rear edge 12 of the link from a central apex 18. As further illustrated in FIG. 1 and as also shown in FIG. 4, the front marginal edge portion of the link 10 is formed, centrally along its length, with a shallow recess 19, for the purpose hereinafter appearing.

Figure 4:
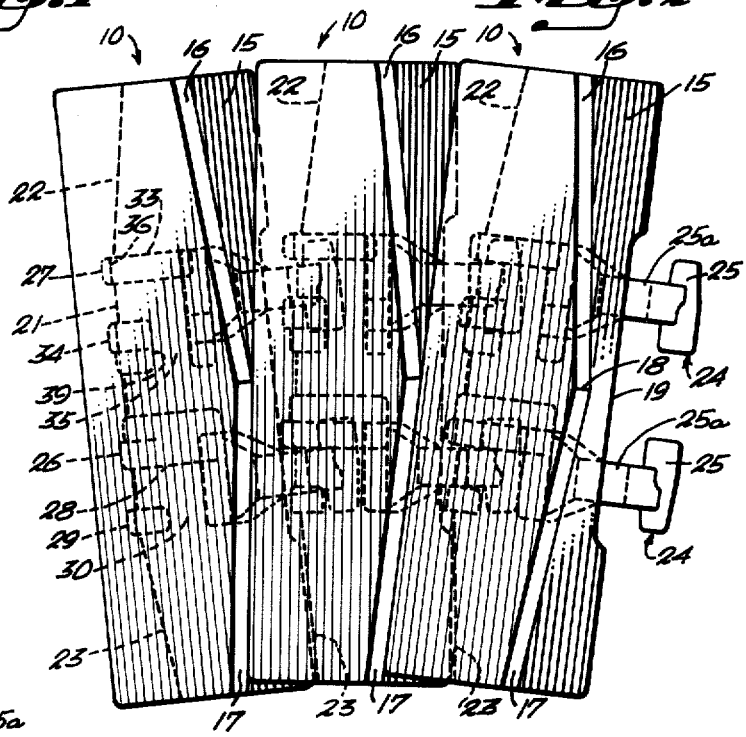
FIG. 4 is a top plan view, on an enlarged scale, of three of the articulated links of FIG. 3, illustrating constructional details thereof.
Figure 5:
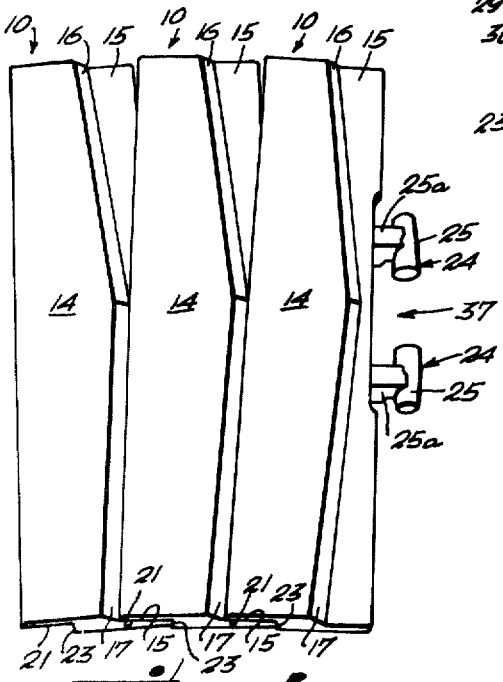
FIG. 5 is a view similar to FIG. 4, but illustrating the three links at a slight oblique angle to show the interfitting engagement at the underside of adjacent links in their passage around a flat curve.

As illustrated in FIGS. 2 and 5, and as also shown in dotted lines in FIGS. 1 and 4, the link 10 is formed with a flat undersurface 20, parallel with respect to the top surface portions 14 and 15, which undersurface is undercut or stepped at the rear of said link to provide a flat, parallel relief surface 21 extending forwardly to a zone of demarcation with respect to the undersurface portion 20 defined by a symmetrically arranged central edge portion 21a, parallel with the rear link edge 12, and opposed, angularly forwardly extending edge portions 22 and 23.

Link interengaging means, indicated generally at 24,24 is integrally formed with and extends downwardly and forwardly of the undersurface portion 20 of the link. The interengaging means 24 comprises a pair of forwardly extending interlocking elements, each of which has a laterally disposed, substantially cylindrical pin 25 lying generally parallel to the plane of the supporting surface and connected to the underside thereof by posts 25a.

Spaced rearwardly of each of the interengaging means 24,24 and also depending from the undersurface portion 20 of the link 10 are two receivers or linking elements 26,27 for receiving interlocking pins 25,25 of an adjacent link. Linking element 26 has a continuous annular wall 28 and a split annular wall 29. Split annular wall 29 provides an opening or entry 30; and continuous annular wall 28 provides a through bore 31. The two annular walls are joined by a transverse wall 32.

Linking element 27 has a continuous annular wall 33 and a split annular wall 34. Split annular wall 34 provides an opening or entry 35, and continuous annular wall 33 provides a through bore 36, said opening 35 and said bore 36 being provided to receive the interlocking element comprising a pin 25 and a post 25a.

As illustrated in FIG. 5, the two linking elements 26 and 27 define therebetween a slide passageway 37 of T-shaped cross-sectional configuration for a track member on which the conveyor travels (not illustrated). Wall 28 has a flange or leg 38 extending therefrom; and wall 34 has a similar flange or leg 39 extending toward flange 38 and spaced therefrom to define an entry to the passageway 37.

Figure 3:
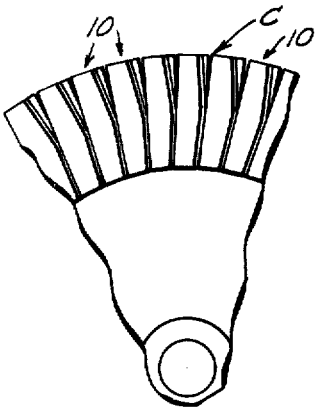
FIG. 3 is a partial top plan view illustrating a portion of a conveyor of articulated links embodying the invention shown rounding a curve and illustrating the interfitting of upper and lower surface portions of successive links to present a substantially flat conveyor surface.

In operation it will be understood that a plurality of links 10 will be assembled by simply interengaging link interengaging means 24,24 with the linking elements 26,27 of successively following link members to provide an articulated conveyor belt such as indicated at C in FIG. 3. With reference to FIGS. 3, 4 and 5, it is to be particularly noted that the downwardly stepped or relief portion 15 in the top or support surfaces 14 provide support areas for the relief surfaces 21 in the undersides of successive links 10 so that their supporting surfaces 14 will normally lie in a substantially flat common plane. The angular configuration of the interfitting upper and lower surfaces 15 and 21, respectively, of successive links are such as permits "fanning out" of the articulated links 10 in one coplaner direction or the other to enable lateral turning of the belt in its path of travel without exposing vertically extending opening between the links. In this connection it will be noted that there is a substantial overlap between adjacent links at the zone just forward of the apex 18 in the upper surface of each link. As illustrated in FIG. 4, the shallow recess 19 in the forward edge of each link provides an opening for receiving rearward-most portions of the linking elements 26,27 when a conveyor of articulated links traverses a curve of maximum curvature.

The bevelled zones of demarcation 16 and 17 in the top surface of the links 10 define inclined riser surfaces presenting obtuse angular inner and outer corner edges therealong which can readily be cleaned from time to time to be kept in sanitary condition. This is particularly important when conveyors of the articulated links are used in cafeterias, restaurants, and the like for transporting food trays.

While I have illustrated and described herein only one form in which my invention can conveniently be embodied in practice, it is to be understood that this form is given by way of example only and not in a limiting sense. Thus, while I have illustrated and described herein a particular link interengaging mechanism for articulating the links into a conveyor belt, other articulating mechanism permitting lateral turning of the conveyor in a common plane could as well be used without departing from the invention. The invention, in brief, comprises all the embodiments and modifications coming without the scope and spirit of the following claims.

What I claim as new and desire to secure by Letters Patent is:

1. A link for articulated-link conveyors comprising, in combination, a substantially rectangular elongated link member having an upper support surface and front and back of edges, mechanism for interconnecting said link member with successive identical link members so as to form a belt-like conveyor of transversely extending articulated links, said interconnecting means being loose enough to permit angular movements in a common plane of the individual links of a plurality of articulated links, and means for overlapping mutually adjacent articulated links to permit their "fanning out" in such angular movements to substantially eliminate separation of their front and back edges, said overlapping means comprising a downwardly stepped surface portion in the front portion of said upper support surface and an upwardly stepped surface portion in the rear portion of the bottom of said link member, said downwardly stepped surface portion of one link being of such size and shape as to be nestingly interfitted in face-to-face relation with the upwardly stepped surface portion of an adjacent articulated link member, the zone of demarcation between the stepped upper surface [portion] *portions* being defined by an inclined riser surface portion presenting obtuse angular inner and outer corner edges therealong, said zone of demarcation defining, along its length, an obtuse angle the apex of which is centrally disposed with respect to the front edge of the link member.

*2. A link for articulated-link conveyors comprising, in combination, an elongated link member having an upper support surface and front and back edges, means for interconnecting said link member with successive identical link members so as to form a belt-like conveyor of transversely extending articulated links, said interconnecting means being loose enough to permit angular movements in a common plane of the individual links of a plurality of articulated links to permit their "fanning out" in such angular movements to substantially eliminate separation of their front and back edges, overlapping means comprising a downwardly stepped surface portion in the front portion of said upper support surface and an upwardly stepped surface portion in the rear portion of the bottom of said link member, said downwardly stepped surface portion of one link being of such size and shape as to be nestingly interfitted and overlapped in face-to-face relation with the upwardly stepped surface portion of an adjacent articulated link member, the zone of demarcation between the stepped upper surface portions being defined by a riser surface portion presenting angular inner and outer corner edges therealong, said zone of demarcation defining, along its length, an obtuse angle the apex of which is centrally disposed with respect to the front edge of the link member.*

* * * * *